US006610134B1

United States Patent
Kind et al.

(10) Patent No.: US 6,610,134 B1
(45) Date of Patent: Aug. 26, 2003

(54) METHOD FOR PRODUCING A CELLULOSE SUSPENSION

(75) Inventors: Uwe Kind, Rudolstadt (DE); Leo Kagalowski, Frankfurt am Main (DE); Marco Blech, Mainz-Kastel (DE)

(73) Assignee: Alceru Schwarza GmbH, Rudolstadt (DE)

( * ) Notice: Subject to any disclaimer, the term of this patent is extended or adjusted under 35 U.S.C. 154(b) by 0 days.

(21) Appl. No.: 09/763,400

(22) PCT Filed: Aug. 13, 1999

(86) PCT No.: PCT/DE99/02583

§ 371 (c)(1),
(2), (4) Date: May 15, 2001

(87) PCT Pub. No.: WO00/09563

PCT Pub. Date: Feb. 24, 2000

(30) Foreign Application Priority Data

Aug. 17, 1998 (DE) .......................................... 198 37 210

(51) Int. Cl.$^7$ .............................. C08L 1/02; C08L 1/06; B29B 7/30; B29B 7/34; B29B 7/44
(52) U.S. Cl. ...................... 106/217.5; 264/349; 366/79; 366/83; 366/91; 366/271
(58) Field of Search ...................... 106/217.5; 264/349; 366/79, 83, 91, 271

(56) References Cited

U.S. PATENT DOCUMENTS

| | | | | |
|---|---|---|---|---|
| 4,416,543 A | * | 11/1983 | Brinkmann | 366/80 |
| 5,108,188 A | * | 4/1992 | Peter et al. | 366/91 |
| 5,330,567 A | * | 7/1994 | Zikeli et al. | 106/200.3 |
| 5,626,810 A | * | 5/1997 | Zikeli et al. | 264/187 |

FOREIGN PATENT DOCUMENTS

DE         226 573        8/1985

* cited by examiner

Primary Examiner—David Brunsman
(74) Attorney, Agent, or Firm—Marianne Fuierer; Steven J. Hultquist; Yongzhi Yang

(57) ABSTRACT

A procedure to continuously produce a suspension of cellulose in aqueous N-methylmorpholine-N-oxide is characterized in that: (a) The cellulose is conveyed through a first shearing zone in the absence of N-methylmorpholine-N-oxide and is homogenized, and (b) the homogenized cellulose is conveyed through a second shearing zone after adding enough aqueous N-methylmorpholine-N-oxide for a suspension to result in a N-methylmorpholine-N-oxide content in the liquid phase of 70–80 weight percent after mixing, whereby the cellulose or suspension almost completely fills the available content cross-section in the shearing zones.

17 Claims, 1 Drawing Sheet

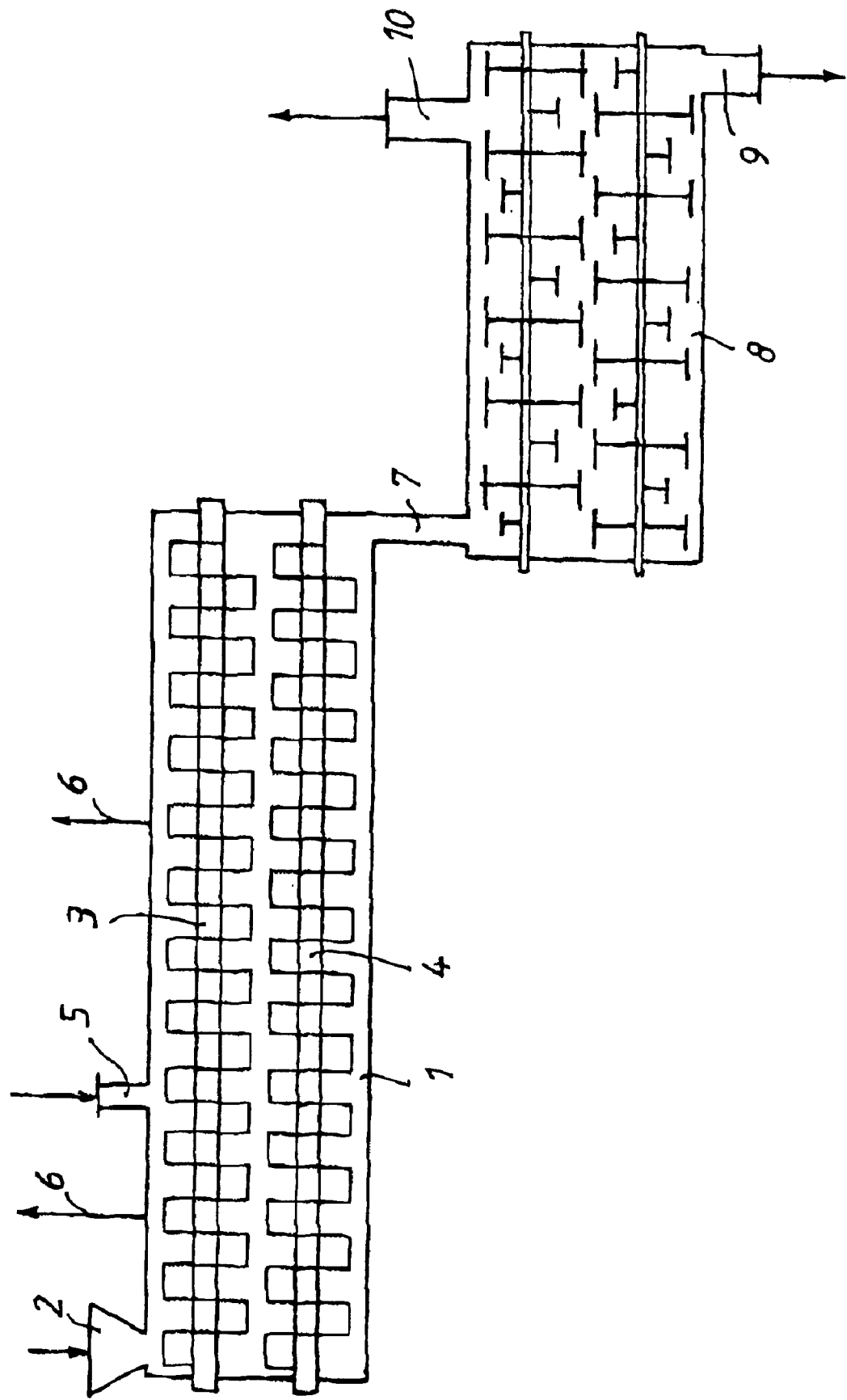

METHOD FOR PRODUCING A CELLULOSE SUSPENSION

CROSS-REFERENCE TO RELATED APPLICATIONS

This application is filed under the provisions of 35 USC §371 and claims the priority of International Patent Application No. PCT/DE99/02583 filed Aug. 13, 1999, which in turn claims priority of German Patent Application No. 198 37 210.8 filed Aug. 17, 1998.

The invention concerns a procedure for the continuous preparation of a suspension of cellulose in aqueous N-methylmorpholine-N-oxide. The suspension can be converted into a cellulose solution by heating and processed into cellulosic molded parts such as fibers, filaments and films by deformation and regeneration.

It is prior-art to prepare a cellulose suspension in aqueous N-methylmorpholine-N-oxide by directly mixing pulverized cellulose with aqueous N-methylmorpholine-N-oxide (NMMO). According to WO 96/33221, the cellulose is mixed in an annular layer mixer with aqueous, e.g. 75 weight percent NMMO. The formed suspension is dissolved in a separate filmtruder. A disadvantage with the annular layer mixer is that only pulverized, essentially dry cellulose can be used. If contrastingly the cellulose e.g. contains water from prior treatment, is difficult to form the layer in the mixer and makes is difficult to mix with the separately added NMMO solution, especially since the shearing field is limited in the layer mixer. Since the suspension is transported as a layer, the throughput of the device cross-section is low.

WO 94/28217 discloses a discontinuous procedure to prepare a suspension of cellulose and aqueous amine oxide. Pulverized cellulose and an amine oxide solution are mixed in a horizontal mixing chamber by a rotor with radial stirring elements. 21 minutes is indicated as the time required for batch. This method is disadvantages because two such mixing chambers must be operated since the following dissolving chamber must be continually fed. In addition, it is difficult to completely empty the mixing chamber.

The problem of the president is to create a procedure for continuous production of a suspension of cellulose in aqueous N-methylmorpholine-N-oxide without the above-cited disadvantages. The procedure allows the use of aqueous cellulose or dry cellulose, and fluctuations in the particle size and/or water contents of the used cellulose are smoothed out so that a solution with a uniform cellulose concentration arises in the following dissolving step. Furthermore, the continuous procedure is to be created in that produces a greater suspension volume in reference to the device cross-section. Finally, a procedure is to be created for the continuous production of a cellulose suspension that can immediately transition into a continuous dissolving step to form an extrudable solution. Other advantages are found in the following description.

This problem is solved according to the invention using the initially-cited procedure by the following: (a) The cellulose is conveyed through a first shearing zone in the absence of N-methylmorpholine-N-oxide and is homogenized, and (b) The homogenized cellulose is conveyed through a second shearing zone after adding enough aqueous N-methylmorpholine-N-oxide for a suspension to result with a N-methylmorpholine-N-oxide content in the liquid phase of 70–80 weight percent after mixing. The cellulose or suspension almost completely fills the available conveyance cross-section in the shearing zones.

According to the invention, the used cellulose in step (a) is first homogenized in regard to its particle size and/or water contents, i.e., local and temporal fluctuations in these two quantities are eliminated to prevent fluctuations of the cellulose concentration in the solution formed in the following step, and partially dissolved cellulose. The amount and water content of the NMMO added in step (b) is adjusted to the amount and potential water content of the used cellulose so that NMMO content in the liquid phase of the formed suspension lies within the above-cited target range of 70–80 weight percent. If for example in step (a) a dry cellulose is used, the NMMO solution used in step (b) can have a concentration in the cited range. If in step (a) aqueous cellulose is used, a more concentrated NMMO solution is added depending on the cellulose concentration of the solution to be prepared. A cellulose/NMMO/$H_2O$ triangle diagram can be used to easily determine the amount and concentrations of aqueous cellulose and NMMO solution to be selected. The suspension can be directly supplied to the step to form a homogenous cellulose solution. Various different procedures can be used to dissolve the cellulose. A suitable procedure is described in DE 44 41 468. In contrast to the initially-cited procedure in which the suspension is conveyed in the form of an annular layer, the entire free cross-section available for conveyance is used in the procedure according to the invention so that a maximum suspension volume can be processed per unit time and unit cross-sectional area. In addition, the high shaft speed required in the annular layer procedure is not necessary in the present procedure. To be understood as "completely full" according to the invention is that there is no continuous steam or gas phase between the entrance of the cellulose and exit of the formed suspension in contrast to the initially-cited annular layer procedure. Individual air or steam bubbles can be in the conveyed material. The more uniform cellulose suspension distribution attained in the procedure according to the invention makes it easier for the cellulose particles to completely dissolve in the dissolving step.

In a preferred embodiment of the procedure according to the invention, the cellulose is sheared and conveyed in two shearing zones by several shafts with shearing and conveying elements arranged in the direction of conveyance. The design of the shearing and conveying elements is the same in both zones. The transition of the first to the second shearing zone is only determined by the feed site of the NMMO solution and can be shifted by moving this site in an axial direction. In general, the first shearing zone in shorter than the second shearing zone. For example, the ratio of their lengths can be 1:2. The shearing effect can be attained by having the shafts rotate at different speeds. It has been shown that the cellulose dissolves better in the dissolving step when it is homogenized without NMMO. In general, 2 to 7 shafts with the corresponding shearing and conveying elements are provided for shearing and conveying the cellulose.

In one embodiment of the procedure, a cellulose is used with a water content of 20–80 weight percent in step (a). The water content of this type of cellulose that fluctuates in use is made more uniform in step (a). For the NMMO content of the created suspension to lie within the cited target range, the water content of the NMMO solution must be inversely adapted to the water content of the cellulose. Since a regenerated solution is frequently used in step (b) from an old precipitation bath, the regeneration of the precipitation bath can be tailored to the formation of an NMMO concentrate with the required concentration. The shearing provided in steps (a) and (b) also comminutes and homogenizes the cellulose particles to an extent unattainable in prior-art annular layer mixers.

In another embodiment, and essentially dry cellulose is used in step (a). In this case is well, the cellulose is homogenized in step (a) as the size of the particles become more uniform. This process is continued in the subsequent step (b). Dry cellulose can also be used together with aqueous cellulose if the water content of the latter is so high (such as 60–80%) that the target range of the NMMO content cannot be attained in the liquid phase of the suspension in step (b) by adding in NMMO monohydrate. Due to the size reduction from the shearing, the cellulose does not have to be previously ground or pulverized.

In a preferred embodiment, aqueous in NMMO is used at a molar ratio of in NMMO/$H_2O$ ranging from 1:1 to 1:2.2 in step (b). The most highly concentrated NMMO that is conventionally used, i.e. NMMO-MH, is used with aqueous cellulose to which water is added and/or which is thermally or enzymatically treated before it is suspended according to the invention. In addition to the homogenization of the particle size that occurs when dry cellulose is used, the water content is also homogenized to improve the following mixture with amine oxide.

It is useful to carry out steps (a) and (b) at a temperature ranging from 75 to 100° C. At these temperatures, the decomposition of cellulose and amine oxide is low; in addition, the homogenization and uniform mixture of wet cellulose with the NMMO concentrate is improved by the high temperature. The heated suspension can be dissolved by evaporating water in a vacuum in a following step without substantially changing the temperature.

In the preferred embodiment of the procedure according to the invention, the two steps (a) and (b) are continuous, and the suspension is continuously drained at the end of step (b) and fed to a dissolving step. The (possibly aqueous) cellulose added at the beginning is continuously transported through the device under shearing forces. After the conveyance path represented by the first step (a), the aqueous in NMMO is added, and the subsequent conveyance path forms step (b). Since the procedure according to the invention is continuous, the formed suspension can be fed to the continuous dissolving step without an intermediate storage container. In general, the overall dwell time ranges from 5–60 minutes in steps (a) and (b). The preferred dwell time is approximately 20–30 minutes.

Additives such as stabilizers can be added to the conveyed material. These attitudes are evenly distributed in the suspension or spinning solution after homogenization, mixing and dissolving.

The invention will now be further explained with reference to the drawing and examples.

BRIEF DESCRIPTION OF THE DRAWINGS

The FIGURE schematically illustrates a system to implement the procedure according to the invention with a connected device for forming a solution.

The first double shaft apparatus 1 is fed cellulose pressed to contain 50 weight percent in moisture from an enzymatic pretreatment system through a funnel 2. In the apparatus 1, there are several shafts with shearing and conveying elements in the device 1 of which to shafts 3, 4 are shown in the drawing. In a first shearing zone that approximately extends over the first third of the entire length of both zones, the shafts are set up for shearing the supplied cellulose. After approximately ⅓ of the device length, there is a feed opening 5 in the cylindrical housing for the aqueous NMMO. Air with a bit of steam is withdrawn through the lines 6. The downstream end of the device is connected by a pipe 7 to a multiple shaft dissolver 8 that serves as the dissolving station. The suspension is transported through the structures on the shafts toward the outlet port 9 while the cellulose is sheared and dissolved. The dissolver 8 is kept under a vacuum through the port 10 which causes the suspension to evaporate water that is removed from the dissolver 8. Both devices 1 and 8 have a heating jacket (not shown) to maintain the desired mixing and dissolving temperature.

EXAMPLE 1

10 kg oven-dried spruce sulfite cellulose (Cuoxam DP 465; a-cellulose content>95%) is added to a pulper with soft water at a ratio of liquor to solids of 1:20 and homogenized. With the aid of a slush pulp pump, the suspension is pumped to a pulp chest, diluted to a stock density of 10 g/l, and 0.1 weight percent enzyme in reference to the cellulose is added at 50° C. After two hours treatment, the cellulose is pressed in a wet felt system, and a cellulose felt with a 50% fiber content is obtained. The cellulose felt is continuously fed to a two-zone double shaft device through an inlet pipe at 158 g/min. In the first zone of the double shaft device, the cellulose/water mixture is homogenized at 90° C. N-methylmorpholine-N-oxide monohydrate is added via a heated feed line at 537 g/min. to the homogenized mixture into a second zone of the double-shaft device. In the following shearing zone, the cellulose/water suspension is evenly mixed with the NMMO-MH. A mash arises containing 81.6% NMMO-MH. This match is then converted in a following evaporation step into a spinning solution with 13.6% cellulose.

The quality of the spinning solution is evaluated with a microscope (Hund H500 WZ) with an evaluation unit (video camera and printer by JVC). The number of dissolved cellulose particles in the spinning solution sample is indicated per 1 $cm^2$. The following quality rating was used:

| Number of undissolved cellulose particles/$cm^2$ | Rating |
|---|---|
| 0–5 | 1 |
| 6–10 | 2 |
| 11–15 | 3 |
| >15 | cannot be spun |

The spinning solution in this example contains five undissolved particles/$cm^2$. Nevertheless, the solution was suitable for creating fibers filaments and films after filtration using a dry/wet spinning procedure.

EXAMPLE 2

A spinning solution was created analogous to the one in example 1. However, the mash was pressed 10 times in a homogenizer before it entered the evaporation stage.

In evaluating the quality of the spinning solution under a microscope, a visually pure solution was determined without cellulose particles (0 undissolved cellulose particles/$cm^2$).

EXAMPLE 3

1.5 kg spruce sulfite cellulose (Cuoxam DP 780; a-cellulose content>91 weight percent) and 7.5 kg water were heated in an enclave for three hours at 129° C. Then the cellulose was separated from water by a centrifuging to produce a cellulose paste with a solid content of 70%. This paste was fed to the system used in example 1 at 158 g/min., and 800 g/min. NMMO-MH was added to the second zone. A mash containing a 83.5% NMMO-MH was obtained, and a spinning solution was obtained in the following evaporation step with a cellulose content of 12.1 weight percent.

When evaluating the quality of the solution under a microscope, only three dissolved cellulose particles/cm$^2$ were found.

What is claimed is:

1. A procedure to continuously produce a suspension of cellulose in aqueous N-methylmorpholine-N-oxide, comprising the steps of:
   (a) conveying cellulose through a first shearing zone in the absence of N-methylmorpholine-N-oxide to form a homogenized cellulose, and
   (b) conveying the homogenized cellulose through a second shearing zone after adding enough aqueous N-methylmorpholine-N- oxide for a suspension to result in a N-methylmorpholine-N-oxide content in the liquid phase of 70–weight percent after mixing, whereby
   the cellulose or suspension almost completely fills the available conveyance cross-section in the shearing zones.

2. The procedure according to claim 1, wherein the cellulose is sheared and conveyed in the two shearing zones by a several shafts with shearing and conveying elements aligned in the direction of conveyance.

3. The procedure according to claim 2, wherein 2 to 8 shafts are used for shearing and conveying.

4. The procedure according to claim 3 wherein an essentially dry cellulose is used in step (a).

5. The procedure according to claim 3, wherein the two steps (a) and (b) are continuous, and the suspension from step (b) is continually drained and fed to a dissolving step.

6. The procedure according to claim 3, wherein the overall dwell time for steps (a) and (b) is 5–60 minutes.

7. The procedure according to claim 3, wherein additives are added to the conveyed material.

8. The procedure according to claim 2, wherein a cellulose with a water content ranging from 20–80 weight percent is used in step (a).

9. The procedure according to claim 8 wherein an aqueous NMMO is used in step (b) with a molar ratio of NMMO/H$_2$O ranging from 1:1 to 1:2.2.

10. The procedure according to claim 2 wherein the cellulose of step (a) is selected from the group consisting of cellulose mixed with water, cellulose enzymatically pretreated and cellulose hydrothermally pretreated.

11. The procedure according to claim 2, wherein steps (a) and (b) are carried out at a temperature ranging from 75 to 100° C.

12. The procedure according to claim l, wherein a cellulose with a water content ranging from 20–80 percent is used in step (a).

13. A system for production of a suspension of cellulose comprising:
   a first and second shearing zone communicatively connected, the first shearing zone comprising at least one inlet for introducing cellulose and an opening for introducing N-methylmorpholine-N-oxide wherein the opening is downstream from the inlet, the first shearing zone having multiple rotating shafts comprising shearing and conveying elements to homogenize and move the cellulose to the second shearing zone; and
   the second shearing zone comprising multiple rotating shafts to shear and dissolve a homogenous suspension from the first shearing zone to form a dissolved cellulose suspension and an outlet for removing the dissolved cellulose suspension.

14. The system according to claim 13, wherein the shearing shafts are aligned in the direction of conveyance.

15. The system according to claim 13, wherein 2 to 8 shafts are used for shearing and conveying.

16. The system according to claim 13 further comprising heating jackets to maintain the desired mixing and dissolving temperature in the first and second shearing zones.

17. The system according to claim 13 further comprising a port in the second shearing zone for communicatively connecting to a vacuum system.

\* \* \* \* \*

UNITED STATES PATENT AND TRADEMARK OFFICE
CERTIFICATE OF CORRECTION

PATENT NO.     : 6,610,134 B1
DATED          : August 26, 2003
INVENTOR(S)    : Blech, Marco et al.

It is certified that error appears in the above-identified patent and that said Letters Patent is hereby corrected as shown below:

Column 5,
Line 19, "70-weight" should be -- 70-80 weight --

Signed and Sealed this

Sixteenth Day of December, 2003

JAMES E. ROGAN
*Director of the United States Patent and Trademark Office*